United States Patent
Ruzicka, Jr. et al.

[11] Patent Number: 5,111,676
[45] Date of Patent: May 12, 1992

[54] TOOL FOR SELECTIVELY BENDING THE TRAILING EDGE TAB OF A HELICOPTER BLADE WHILE SIMULTANEOUSLY MEASURING THE TRUE DEGREE OF TAB BENDING

[75] Inventors: Harry L. Ruzicka, Jr., Easton; Anton J. Kompare, Hamden, both of Conn.

[73] Assignee: United Technologies Corporation, Hartford, Conn.

[21] Appl. No.: 592,428

[22] Filed: Oct. 4, 1990

[51] Int. Cl.⁵ .................. B21C 51/00; B21D 7/00; B21D 53/92
[52] U.S. Cl. ........................... 72/34; 72/298; 72/311; 72/319; 29/889.6
[58] Field of Search ............... 72/298, 299, 311, 319, 72/34, 33; 29/889, 889.6, 889.1

[56] References Cited

U.S. PATENT DOCUMENTS 2,297,055 9/1942 Grad ............................. 72/299
2,359,277 10/1944 Saunders ....................... 72/299
2,422,042 6/1947 Roberts ......................... 72/319
3,280,607 10/1966 Esken ............................ 72/299

FOREIGN PATENT DOCUMENTS 2358205 5/1975 Fed. Rep. of Germany ......... 72/34

Primary Examiner—Daniel C. Crane
Attorney, Agent, or Firm—Vernon F. Hauschild

[57] ABSTRACT

A tool mountable on a helicopter blade for selectively bending the trailing edge trim tab of the blade about a selected axis along the span of the trim tab, and including a device to counterbalance the weight of the trim tab bending mechanism so that the true degree of bending of the trim tab can be determined at any time during the bending operation. The tool also includes apparatus for simultaneously calibrating the counterbalance device and the mechanism used to measure the degree to which the tab has been bent, prior to commencing the bending operation.

14 Claims, 3 Drawing Sheets

TOOL FOR SELECTIVELY BENDING THE TRAILING EDGE TAB OF A HELICOPTER BLADE WHILE SIMULTANEOUSLY MEASURING THE TRUE DEGREE OF TAB BENDING

TECHNICAL FIELD

This invention relates to helicopter blades and more particularly to a tool for selectively bending the trailing edge tab of a helicopter blade, which is capable of bending the tab about a selected axis along the full span of the trailing edge tab, and for simultaneously measuring the true degree of bending throughout the bending operation by counterweighting the bending mechanism to produce a torque thereon in cancellation of the torque which the bending mechanism weight would otherwise impose upon the trailing edge tab.

BACKGROUND OF THE INVENTION

In helicopter blades, it is common practice to utilize a trailing edge tab extending in the span direction of the helicopter blade and toward its outboard end for a selected distance and to permanently deform this trailing edge tab, also called the trim tab, selectively to alter the aerodynamic characteristics of an individual blade for the purpose of matching its performance to a master blade. The tab is deformed to an angle which will aerodynamically correct for imperfections which occur during the fabrication of the blade, that is, imperfections such as camber, and contour deviations. Once all the blades are "tracked" or match the master blade, the vibration levels in a helicopter rotor are minimized.

In the early prior art, a simple tool was used to bend the trailing edge tab. This tool had a trough shaped member which enveloped a small portion of the span dimension of the tab, and also had a handle projecting therefrom. Sections of the tab were manually bent by the operator applying force to the extending handle and thereby bending a portion of the blade tab. The next portion of the blade tab then had to be bent. Each successive portion so bent had to be separately measured to determine the degree of bending.

At a later time, more sophisticated tools, such as that taught in Roberts U.S. Pat. No. 2,422,042, were utilized. While the Roberts tool provided both means to bend the trailing edge tab and to measure the degree of bending, it grips the very trailing edge of the tab in a V-shaped notch so that it does not have the capability of bending the tab about a selected spanwise extending axis of the tab. In modern helicopter rotor trailing edge tabs, it is important to be able to bend the tab about a selected spanwise extending axis to avoid bending the tab at welds, and other joints that might be vulnerable to cracking. Further, the Roberts tool does not have the capability of measuring the true degree of bending simultaneously with the bending operation since the weight and friction of the bending apparatus is continually imposed upon the tab during both the bending and measuring operation. Therefore, the Roberts tool had to be removed to permit true bending measurements of the tab to be made.

At a later time, German Patent No. 2,358,205 to Messerschmidt Bolk taught a trailing edge tab bending and measuring apparatus but, as best understood, the apparatus does not have the capability of bending the trailing edge tab about a selected spanwise axis, nor obtaining the true degree of bending by eliminating the weight of the bending and measuring apparatus by appropriate counter weighting.

DISCLOSURE OF THE INVENTION

It is an object of this invention to provide a tool for selectively bending the trailing edge tab of a helicopter blade, which tool is capable of bending the tab throughout its entire spanwise dimension, which tool is operable by one person, and which tool is light in weight, and which tool is capable of bending the tab and measuring the true degree of bending of the tab simultaneously.

It is a further object of this invention to provide such a tool which is one piece when assembled, but which is disassemblable into selected segments for the convenience of storing.

It is a further object of this invention to provide such a tool which has provisions for assuring that the trim tab is in proper position in the bending mechanism before the bending operation commences.

It is a very important object of this invention to provide such a tool with provisions for flushly engaging both the top and bottom surfaces of the trim tab with members which terminate in alignment substantially along a selected axis in the spanwise direction of the tab so that, during bending operation, the tab will be bent about that selected axis, thereby avoiding bending of the tab in areas which are vulnerable to fracture.

It is a very important object of this invention to teach such a trailing edge tab bending tool which not only has the capability of bending the tab and measuring the degree of bend simultaneously while the tool is firmly supported in fixed position from the helicopter blade, but which also teaches selectively counter weighting the blade bending mechanism so that the tab being bent is free of the weight of the bending mechanism and, therefore, measurements of tab bending taken at all times during the bending operation are true measurements.

It is still a further object of this invention to teach such a tool having provisions for calibrating the bending measuring apparatus and the counterweight apparatus before the bending operation commences.

Other objects, features and advantages of the invention will become apparent in light of the following description thereof.

BEST MODE FOR CARRYING OUT THE INVENTION

Figure 1:
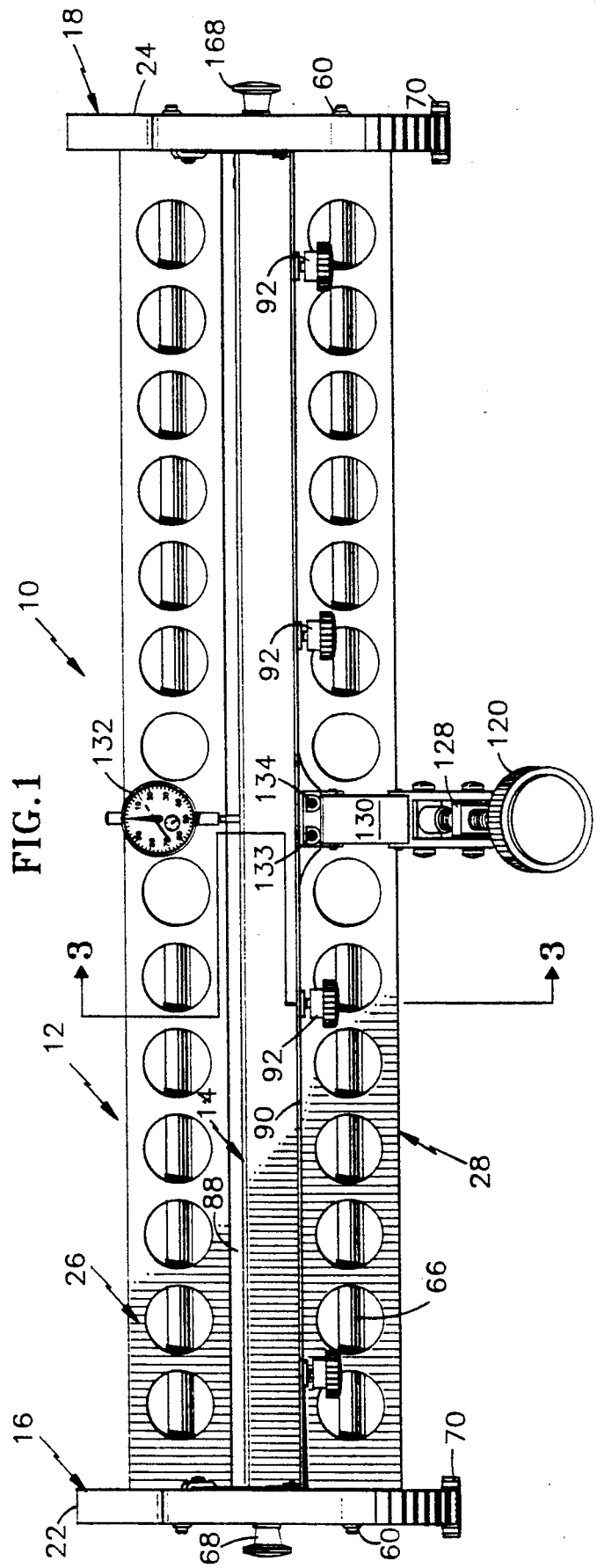
FIG. 1 is a front view of our trailing edge tab bending tool.

Viewing FIG. 1, we see our trailing edge tab bending tool 10 which comprises support assembly 12 which serves to support trailing edge tab engaging and bending means 14 so that bending means 14 is rotatable with respect to support means 12 during the tab bending operation.

Figure 3:
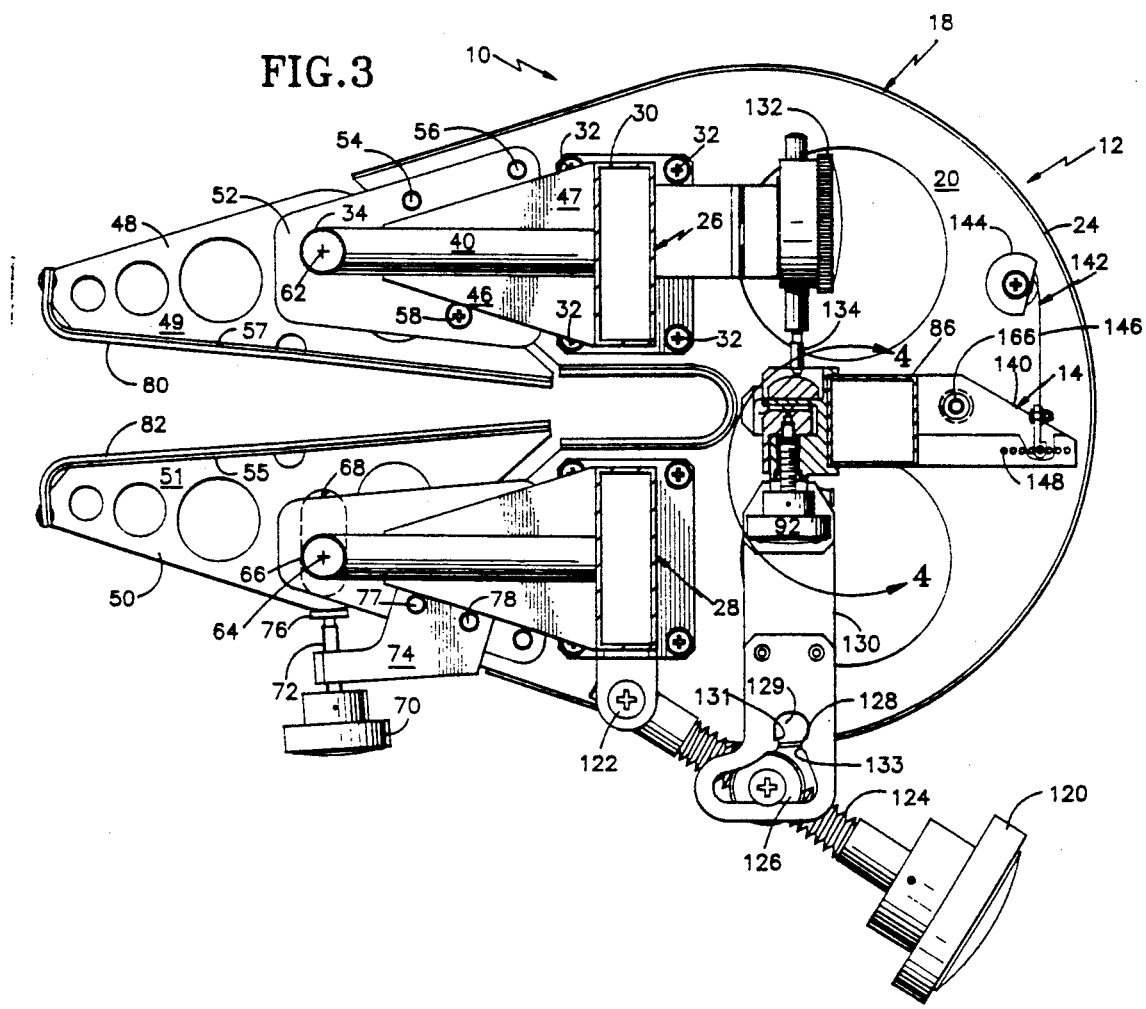
FIG. 3 is a sectional view of our tool taken along line 3—3 of FIG. 1.

Support means 12 includes end members 16 and 18, which are substantially C-shaped in cross-section as shown in FIG. 3, and which include flat surfaces 20 enveloped in peripheral flanges 22 and 24. Flanges 22 and 24 are welded to flat surfaces 20 so as to form a T-shape therewith for strength purposes. Parts 20, 22 and 24 are preferably made of aluminum as are most parts of tool 10 for purposes of producing a lightweight tool. End members 16 and 18 are oppositioned in spaced relationship a distance greater than the span dimension of the trailing edge tab to be bent, by dual, and identical central support assemblies 26 and 28, only one of which will be described in detail, since the two are identical. A typical trailing edge tab is about 36 inches long, 0.032 inches thick, and made of 6061-T6 aluminum.

In an untwisted helicopter blade, end members 16 and 18 will be parallel. In a twisted blade end members 16 and 18 would remain parallel, but their angle relative to the bending axis 106 would change depending on the amount of twist. Also, for a twisted blade, end members 16 and 18 would be rotated with respect to one another so that the jaws of each would address the blade in the same manner at both positions.

Structural support mechanism 26 comprises support tube 30, which extends between end members 16 and 18, and its flanged ends are attached to flat surface 20 of end members 16 and 18 through nut and bolt members 32. As best shown in FIG. 3, support tube 30 is rectangular in cross-section. Support member 26 further includes tubular members 34, 36, 38, 40, 42, and 44, each of circular cross-section. These members are positioned as shown in FIG. 2 and welded to each other and to support tube 30 to provide a rectangularly shaped and, hence, maximum strength support member 26 for supporting end members 16 and 18, in cooperation with identical support member 28.

As best shown in FIG. 3, triangularly shaped gussets 46 and 47 are positioned on opposite sides of tube 40 for strength purposes and are welded thereto and to support tube 30.

Figure 2:
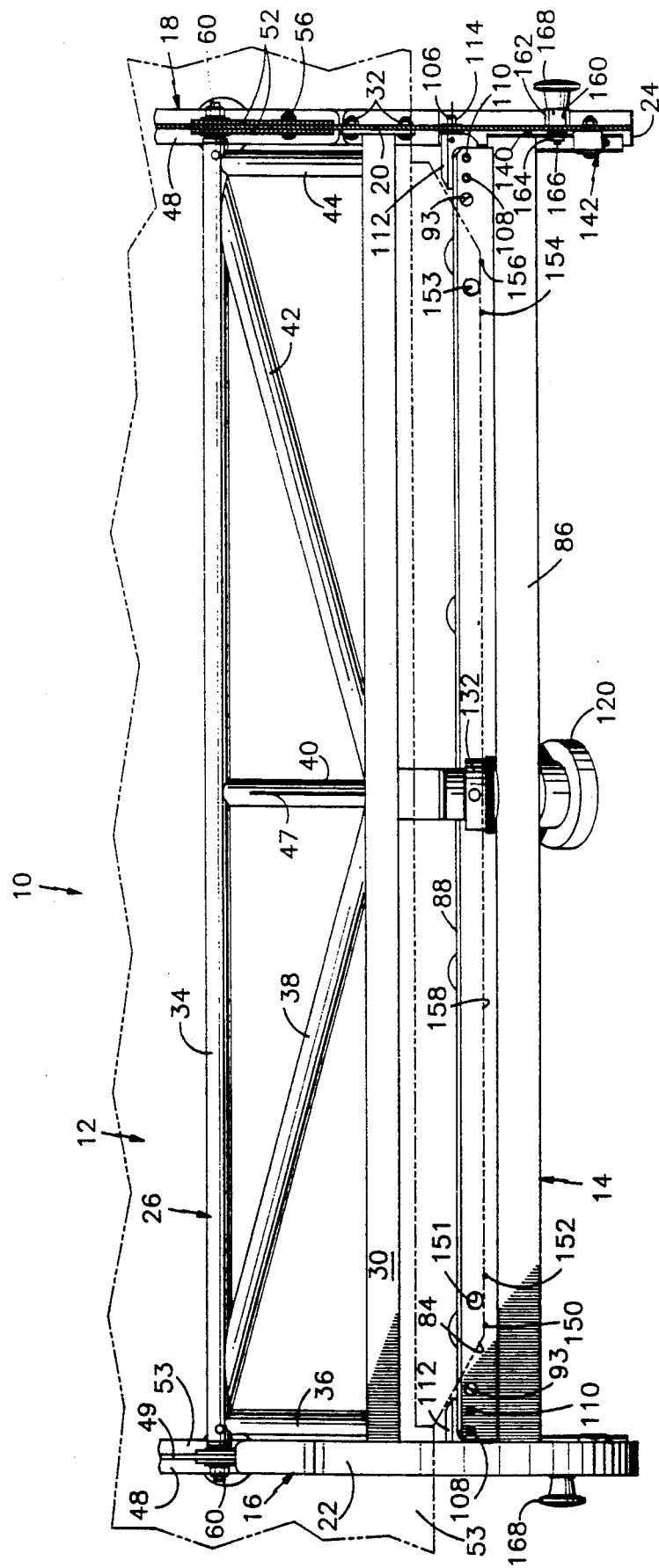
FIG. 2 is a top view of our trailing edge tab bending tool.

Clamping members 48 and 50 serve to engage the upper and lower surfaces of the helicopter blade shown in phantom at 53 in FIG. 2. Clamping members 48 and 50 consist of web members 49 and 51, which are welded to flange members 57 and 55, so as to be of T-shaped cross section. Upper member 48 is supported from support member 20 so as to be pivotable about axis 62 as it slides between plate members 52. The amount of pivotal movement of upper member 48 about axis 62 is limited to a small amount by the oversized hole (not shown) in member 48 which engages screw 58. Screw 5 is not tightened fully, thereby allowing member 48 to rock or pivot freely between plates 52 within the limits established by the aforementioned oversized hole. Plate members 52 are positioned on opposite sides of flat surface 20 and the web 49 of clamping member 48, and are connected to flat surface 20 of end member 18 by fixed bolts 54 and 56, and a third bolt (not shown). Clamping member 48 is supported by connection to shaft 34 of support assembly 26 through bolt mechanism 60, shown in FIG. 2, so that clamping member 48 can be pivoted slightly about axis 62 to optimize its engagement with the upper surface of the helicopter rotor blade.

Lower clamping member 50 is similarly supported from support mechanism 28 for rotation about axis 64. In addition, since the shank of bolt mechanism 60 passes through elongated slot 68 in web 51 of lower members 50, lower clamping member 50 can be moved toward and away from the bottom surface of the helicopter blade, as well as pivoted about axis 64. Movement of lower member 50 toward the helicopter blade is accomplished by the rotating of knob 70, which causes the rotation of threaded shaft member 72 to cause plate member 76 to bear against lower clamping member 50 and cause it to move toward the under surface of the helicopter blade, shown as 53 in FIG. 2. With knob 70 backed off, lower member 50 can be manually moved away from the under surface of the helicopter blade. Support member 74 is supported from flat surface 20 of support member 18 by bolts 77 and 78. Clamping members 48 and 50 have a rubberized surface 80 and 82 on flange members 53 and 55 to do the actual engagement to the upper and lower surfaces of the helicopter blade so as to prevent damage thereto.

Clamping members, such as 48 and 50, are associated with each end member 16 and 18, and are operable to clamp to the upper and lower surfaces of the helicopter blade 53 in spaced relationship a distance greater than the full spanwise dimension of the rotor blade trailing edge tab, shown in phantom as 84 in FIG. 2.

It will, therefore, be seen that tool 10 is capable of clamping to the upper and lower surfaces of the helicopter rotor blade 3 at stations beyond the inboard and outboard end of the trailing edge tab 84, so that the entire tool 10 is supported from the helicopter blade 53 in fixed relationship thereto. This is the desired position and condition for the tab bending operation.

Figure 4:
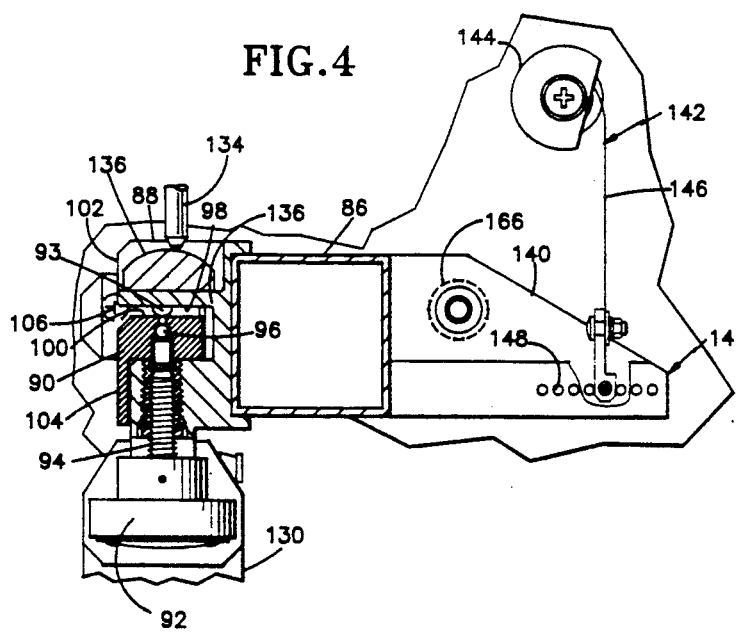
FIG. 4 is an enlarged view taken along lines 4—4 of FIG. 3.

Now considering blade engaging and bending mechanism 14, that mechanism includes torque tube member 86, which is shown to be substantially square in cross-section in FIGS. 3 and 4, extends between end support members 16 and 18. Fixed blade tab engaging member 88 is welded or otherwise integrally connected to torque tube 86.

Movable blade tab engaging member 90 can be caused to move toward and away from the tab as it extends between members 88 and 90 by the rotation of knob member 92. Knob member 92 is threadably connected by threaded shaft 94 to corresponding threads in fixed member 88 so that the rotation of knob 92 causes member 90 to move toward or away from member 88, against the force of two spring plungers 93 which are mounted in member 88 and tend to keep the jaw open to receive the trailing edge tab 84 which will be positioned therebetween. Shaft 94 preferably bears against movable member 90 through ball member 96 so that the operator will experience minimum resistance in turning knob 92. A series of turning knob mechanisms 92 are positioned along movable member 90, as shown in FIG. 1. The adjacent surfaces 98 and 100 of members 88 and 90 are shaped so as to flushly engage the top and bottom surfaces, respectively, of the trailing edge tab 84 when positioned therebetween, as shown in phantom in FIG. 2. Edges 102 and 104 of members 88 and 90, respectively, are in alignment and in substantial alignment with axis 106, which extends in a spanwise direction for the full span dimension of tab 84, and is the axis about which the trailing edge tab 84 is to be bent during the bending operation.

Along with torque tube 86, fixed and movable members 88 and 90 extend substantially the full distance between end supports 16 and 18, and are supported therefrom for rotation about axis 106. As best shown in FIG. 2, the opposite ends of fixed member 88 is connected by bolt or screw members 108 and 110 to member 112 from which pin 114 projects and extends through ball bearinged apertures the flat surface 20 of opposite support members 16 and 18. In this fashion, the blade bending mechanism 14 is supported for rotation about axis 106 such that, when engaging trailing edge tab 84, rotation of member 14 will cause the trailing edge tab to bend about axis 106. Further, frictionless operation in the connection between flat surface 20 and pins 114 allow the trailing edge tab 84 to spring back to its free state without impediment.

Member 14 is caused to rotate about axis 106 by the action of knob 120 which is pivotable about pin connection 122 from the support tube of member 28, as shown in FIGS. 3 and 4. Rotation of knob 120 causes the rotation of threaded shaft 124, which threadably engages nut-like member 126, which in turn is received in L-shaped slot 128 of link member 130. Link member 130, as best shown in FIG. 1, is attached at its upper end by bolts 133 and 134 to flanges which project from fixed member 88. Accordingly, with knob 120 in a position which will cause member 126 to be in engagement at the top of leg 129 of L-shaped slot 128, rotation of knob 120 will cause the blade bending mechanism 14 to rotate about axis 106. Ball end spring plungers 131 and 133 are provided at slot 128 to support shaft 124 in the bending position while the operator's hand is disengaged from knob 120.

Since it is an important teaching of our invention that the degree of bending be simultaneously measured at the time the bending operation is occurring, dial indicator 132 is supported from support tube 30, as shown in FIG. 3, and its translatable plunger 134 bears against surface 136 of fixed member 88 so as to continuously give a reading of the degree of bending of the trailing edge tab throughout the bending operation. For large tab bend angles, surface 136 is preferably of convex contour so that side thrust on plunger 134 is minimized This contouring also provides a linear relationship between the indicator reading and the actual bend angle.

It is important to our invention that the plunger 134 of dial indicator 132 be positioned close to bending axis 106 so that geometric inaccuracies which could be brought into the reading of fixed dial indicator 132 by the pivoting motion of member 14 will be minimized or eliminated.

Tab bending mechanism 14 also includes arm members 140 which are connected to both ends of torque tube 86 for rotation therewith about selected axis 106. Arm 140 is part of counterweight mechanism 142, which consists of a constant force spring (negator) which is housed in housing 144 which attaches to flat portion 20 of end member 18.

Counterweight mechanism 142 performs the very important function of applying a counterclockwise torque to movable member 14 during the blade bending operation, in canceling opposition to the clockwise torque imposed upon the trailing edge tab being bent by the weight of bending mechanism 14. Because of this counterweight arrangement, and the frictionless nature of the bending hinge due to the reception of pivot pins 114 in ball bearings mounted in flat surface 20 of support members 16 and 18, bending mechanism 14 is weightless during the tab bending operation so that the true bending of tab 84 can be read on the dial indicator 132 at all times. This is significant in that it is the recognized characteristic of resilient members, such as trailing edge tab 84, that when released following the application of a bending force, its resiliency will cause the member to return to a position toward its original position This is the true bent position of the tab and this is the position which dial indicator 132 reads when nut 126 is disengaged from the top of leg 129 of slot 128 and allowed to rest at the bottom of the slot.

Before the blade bending operation commences, it is important that the blade trailing edge tab 84 be in proper position and register with tab engaging and bending member 14. This is accomplished by providing positioning pins 150, 152, 154 and 156 (see FIG. 2) in fixed member 88, against which the trailing edge 158 of trim tab 84 is brought into register before the bending operation commences. Viewing holes 151 and 153 are provided in fixed member 88 so that the operator can see whether the tab is fully seated. Pins 150 through 156 are selected to perform this function, rather than flat surfaces, because any foreign material which might otherwise lodge between the trailing edge 158 of the tab and fixed member 88 will pass around pins 150–156, whereas this would not occur if a flat surface was substituted for pins 150–156.

Calibrating plungers 168 are selectively positioned to establish a reference plane with the slot defined between fixed and movable members 88 and 90 into which the trailing edge tab 84 is positioned for bending.

It will, therefore, be seen that aligning plungers 168 perform the function of calibrating both counterweight mechanism 142 and dial indicator 132 simultaneously.

Our preferred method of calibrating our trailing edge tab bending tool 10 is to utilize the reference plane which the inserted calibrating plungers 168 establish with the slot defined between fixed and movable members 88 and 90, as the established referenced position for the bending tool 10. With calibrating plungers 168 inserted, which is their normal tool storage position, we bring the reading of dial indicator 132 to a desired position, preferably a 0 position which occurs at 0° tab bending and from which the plunger of the dial indicator can move in either direction since the blade tab may have to be bend upwardly or downwardly. With plungers 168 so inserted and the dial indicator 132 at a 0 or other desired reference reading, tool 10 is at an initial calibration and ready to perform the trailing edge tab bending function. Plungers 168 must be retracted prior to mounting tool 10 onto helicopter blade 53 so that member 14 may be rotated freely.

Further, we must calibrate the counterweight member 142 so that is produces a moment which cancels the moment that will be imposed upon the tab by the movable portion 14 of tool 10. This calibration of the counterweight is typically performed initially upon completion of construction of the tool 10, and need not be repeated at each use of the tool.

With calibrating plungers 168 out of register with the aligned holes, and with knob 120 and shaft 124 in their FIG. 3 positions, we want the movable portion 14 of tool 10 to remain stationary with respect tot he remainder of the too. If we find that this is initially not the case, i.e. member 14 tends to rise or descend relative to the zero degree tab position, then we insert the end of negator spring 146 into a different one of the calibrating holes 148 until this equilibrium or stationary position of member 14 with respect to the overall tool 10 is achieved.

With the tool 10 in its referenced position and with dial indicator 132 reading 0° bending of the trailing edge tab, and with the counterweight mechanism 142 so calibrated or balanced, we are ready to commence the tab bending operation as described above.

With plungers 168 out of engagement, tool 10 is mounted on helicopter blade 53 as described earlier.

With tool 10 so calibrated and mounted, the helicopter trailing edge tab bending operation is ready to commence.

At any time during the tab bending operation, the operator can determine the degree of true bend in the tab by bringing knob 120 and shaft 124 to their FIG. 3 position, at which time the spring back of the trailing edge tab will cause it to move to its true bent position, since the counterweight action of negator spring mechanisms 142 cancels the effect of the weight of the bending mechanism 14 on the tab. Therefore, the true bent position will be read by the dial indicator 132.

In operation, tool 10 is fixedly secured to the helicopter blade 53 trailing edge portion such that trim tab 84 is abutting positioning pins 150-156 as shown in FIG. 2. At this point, knobs 92 are utilized to bring movable portion 90 of the bending mechanism 14 into flush contact with the bottom surface of the trim tab 84, and rotatable knob 70 is utilized to bring clamping mechanism 50 into register with the bottom surface of the helicopter blade. At this point, tool 10 is being supported from helicopter blade 53 with trailing edge tab 84 in proper position to be bent about selected axis 106. Before the bending action occurs, calibrating knobs 168 are used as described above to assure that both counterweight means 142 and the dial indicator mechanism 132 are in proper calibration before the bending operation commences.

To commence the bending operation, knob 120 is pivoted about connection 122 to the top of leg 129 of slot 128 shown in FIG. 3. Rotation of knob 120 thereafter will cause bending mechanism 14 to rotate about axis 106 and thereby bend the trailing edge tab 84 about the selected axis 106. During the bending operation, if the operator wishes to read the true degree of bending, he brings knob 20 to its FIG. 3 position, allowing the trim tab to spring back unimpeded.

Another advantage of our tool 10 is that it can be disassembled into parts for convenient storage. For example, by undoing bolts 108 and 110, rotating mechanism 114 can be released from the support mechanism 12. Further, in the support mechanism 12, by releasing nut and bolt arrangements 32 and 60, members 26 and 28 can be separated from end members 16 and 18 for convenient storage. Tool 10 may also be stored fully assembled in a storage case to save disassembly and assembly time.

We claim:

1. A tool for selectively bending the trailing edge tab of a helicopter blade comprising:
    a. two C-shaped support members;
    b. first support means supporting said C-shaped members in spaced relation so that their spacing is larger than the span dimension of the trailing edge tab to be bent;
    c. second support means for supporting said C-shaped members and said first support means in fixed position from a helicopter blade;
    d. trailing edge tab bending means supported by frictionless bearings between said C-shaped members so as to be pivotable with respect thereto about a selected axis and about which axis the trim tab is to be bent along its span dimension, including;
        (1) fixed and movable members shaped to flushly engage the top and bottom surfaces of the trailing edge tab throughout substantially its full span dimension, and terminating in alignment substantially along said selected axis;
    e. means to cause said tab bending means to selectively rotate about said selected axis so that when engaging a trim tab, it will bend the trim tab about said selected axis; and
    f. negator spring means connected to said bending means and operable to resiliently apply a moment thereto in opposition to the moment which would be applied by the weight of the tab bending means to a trailing edge tab being bent so that the true degree of bending of the tab can be ascertained at any time during the bending operation.

2. A tool according to claim 1 and including means to continuously measure the degree of bending of the trim tab during the bending operation.

3. A tool according to claim 2 and including means operative to engage the rear tip of the trim tab to be bent to assure that the bending means is in proper engagement with the trim tab to be bent before the bending operation commences.

4. A tool according to claim 3 and including means to simultaneously ascertain whether said moment creating means and said measuring means are in proper calibration before the tab bending process commences.

5. A tool according to claim 4 wherein said first support means includes two identical, interchangeable support systems, each comprising:
    a. a torque tube extending between and connected to said C-shaped support members;
    b. an array of support tubes connected to and extending from said torque tube and connected to each other so as to form a rectangular support with said torque tube; and
    c. strengthening means positioned between and connected to said tube array and said torque tube.

6. A tool according to claim 5 wherein said second support means comprises:
    a. means supported from said first support means to support said tool from and in fixed relationship to the trailing edge of a helicopter blade including:
    1) two upper attachment means spaced so as to engage the blade top surface beyond the opposite ends of the trailing edge tab to be bent; and
    2) means to support said upper attachment member from said first support means so as to be adjustable in position;
    3) two lower attachment means spaced so as to engage the blade bottom surface beyond the opposite ends of the trailing edge tab to be bent and in vertical alignment with said upper attachment means;
    4) means connecting said lower attachment means to said first support means so that the lower attachment means is pivotable and also movable both toward and away from said blade bottom surface; and
    5) means to cause said lower attachment means to be moved toward and away from the blade lower surface and to be retained in constant engagement therewith.

7. A tool according to claim 6 wherein the fixed and movable members of said bending means are adapted to extend spanwise beyond the trailing edge tab to be bent, and including:
    a. means positioned along said movable member to cause said movable member to translate toward and away from said fixed member and to retain said movable member in position when the trailing edge tab to be bent is in position between the fixed and movable members during the tab bending operation.

8. A tool according to claim 7 wherein said tab bending means includes:
   a. an arm member extending from said fixed and movable members, and having a selectively shaped slot therein;
   b. a threaded shaft pivotally connected at one end to said first support means and having a rotatable knob at the opposite ends thereof; and
   c. a nut-like member positioned along and threadably engaging said threaded shaft and being positionable in a first position in said slot of the arm member so that said rotatable knob can be rotated to cause said bending means to rotate about said selected axis during the blade bending operation, and so that said knob may be used to move the nut-like member to a second position within said slot so as to disengage the rotatable knob, threaded shaft and nut-like member from the blade bending system, and wherein said slot is so shaped that said shaft may be reengaged into the first position from the second position without having to rotate said knob to reposition said nut-like member.

9. A tool according to claim 8 wherein said moment applying means is a counterweight mechanism including:
   a. an arm member connected to and extending from said tab bending means fixed member, and having a series of apertures extending therethrough at the outer end thereof; and
   b. a reel-type constant-force spring supported from a housing connected to said first support means and having a spring end connected at one of the apertures to said arm means by a pin passing therethrough, said reel spring being biased to impose a moment on the trailing edge tab bending means to counteract and cancel the moment applied to the trailing edge tab being bent by the weight of the tab bending means, so that the trailing edge tab bending means, in effect, is weightless during the tab bending operation.

10. A tool according to claim 9 wherein said measuring means is a dial indicator supported from said first support means and having a plunger extending therefrom and being spring loaded so as to bear against said fixed member of the tab bending means to follow the motion thereof during the blade bending operation, and wherein said fixed member has a selectively shaped convex surface against which said plunger bears so as to minimize the side thrust of said plunger at large bending angles, and also to provide a linear relationship between the dial indicator reading and the actual tab bend angle, and wherein said plunger is located in close proximity to said selected axis about which the trailing edge tab is to be bent to allow full tab bending range to be indicated within the inherent limits of said dial indicator.

11. A tool according to claim 10 wherein said means for engaging the rear tip of the trim tab are a series of selectively positioned pins supported in said fixed member of said tab bending means, and including viewing holes to permit the operator to detect visually whether the trailing edge of the tab to be bent is in register with the positioning pins.

12. A tool according to claim 11 wherein said means to simultaneously ascertain whether the moment creating means and the measuring means are in proper calibration before the tab bending process commences comprises:
   a. selectively positioned apertures in said first support means and said trailing edge tab bending means, which apertures are selectively positioned so as to be in alignment when the moment created on the tab bending means by the counterweight mechanism is substantially equal to the moment created by the weight of the tab bending means; and
   b. a calibrating pin adapted to extend between said two holes when in alignment so that the dial indicator may be calibrated with the holes so aligned.

13. A tool according to claim 12 and including depressable means to hold said movable member of said bending means in spaced relation to said fixed member of said bending means so as to define a slot therebetween, until said depressable means is depressed by the trailing edge tab as the trailing edge tab is introduced into said slot.

14. A tool according to claim 13 and including spring biased plungers selectively positioned in the selectively shaped slot in said arm member of said tab bending means to hold the threaded shaft unsupported in operating position for tab bending.

* * * * *